(12) United States Patent
Park et al.

(10) Patent No.: US 8,804,799 B2
(45) Date of Patent: Aug. 12, 2014

(54) SIGNAL QUALITY MEASURING APPARATUS AND METHOD THEREOF

(75) Inventors: Hyun-soo Park, Seoul (KR); Kyung-geun Lee, Seongnam-si (KR); In-oh Hwang, Seongnam-si (KR); Hui Zhao, Suwon-si (KR); Jong-hyun Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 749 days.

(21) Appl. No.: 12/726,374

(22) Filed: Mar. 18, 2010

(65) Prior Publication Data

US 2010/0238989 A1 Sep. 23, 2010

Related U.S. Application Data

(60) Provisional application No. 61/161,457, filed on Mar. 19, 2009, provisional application No. 61/165,578, filed on Apr. 1, 2009, provisional application No. 61/169,417, filed on Apr. 15, 2009.

(30) Foreign Application Priority Data

Nov. 5, 2009 (KR) .................. 10-2009-0106666

(51) Int. Cl.
*H04B 17/00* (2006.01)
(52) U.S. Cl.
CPC ................... *H04B 17/0057* (2013.01)
USPC ...... 375/224; 375/232; 369/60.01; 369/59.17
(58) Field of Classification Search
USPC ................ 375/224, 232; 369/60.01, 59.17
See application file for complete search history.

(56) References Cited

U.S. PATENT DOCUMENTS

| | | | |
|---|---|---|---|
| 5,243,605 A * | 9/1993 | Lekmine et al. | 714/795 |
| 5,490,127 A | 2/1996 | Ohta et al. | |
| 7,212,815 B1 | 5/2007 | Juric | |
| 7,477,709 B2 | 1/2009 | Park et al. | |
| 7,804,755 B2 | 9/2010 | Park et al. | |
| 7,952,974 B2 | 5/2011 | Park et al. | |
| 8,385,173 B2 | 2/2013 | Park et al. | |
| 2003/0026028 A1 | 2/2003 | Ichihara et al. | |

(Continued)

FOREIGN PATENT DOCUMENTS

| | | |
|---|---|---|
| CN | 1849661 A | 10/2006 |
| JP | 06-325365 A | 11/1994 |

(Continued)

OTHER PUBLICATIONS

International Search Report and Written Opinion of the International Searching Authority issued Oct. 28, 2010, in counterpart International Application No. PCT/KR2010/001606 (8 pages).

(Continued)

*Primary Examiner* — Michael Neff
(74) *Attorney, Agent, or Firm* — NSIP Law

(57) ABSTRACT

A signal quality measuring apparatus includes a binary signal generating unit to generate a binary signal from an input signal; a level information extracting unit to extract level information from a relationship between the input signal and the binary signal using at least two window lengths; and a quality calculating unit to calculate a quality of the input signal based on the level information.

22 Claims, 16 Drawing Sheets

(56) References Cited

U.S. PATENT DOCUMENTS

| | | |
|---|---|---|
| 2003/0043939 A1 | 3/2003 | Okumura et al. |
| 2005/0083822 A1 | 4/2005 | Park et al. |
| 2005/0128918 A1 | 6/2005 | Park et al. |
| 2005/0163029 A1 | 7/2005 | Tobita |
| 2006/0208766 A1 | 9/2006 | Ogura et al. |
| 2007/0189132 A1* | 8/2007 | Park .......................... 369/44.29 |
| 2007/0234188 A1 | 10/2007 | Shiraishi |
| 2010/0266074 A1 | 10/2010 | Park et al. |

FOREIGN PATENT DOCUMENTS

| | | |
|---|---|---|
| JP | 2007-506216 A | 3/2007 |
| JP | 2007-511031 A | 4/2007 |
| KR | 10-2000-0032909 A | 6/2000 |
| KR | 10-2002-0090919 A | 12/2002 |
| KR | 10-2002-0096827 A | 12/2002 |
| KR | 10-2004-0097209 A | 11/2004 |
| KR | 10-2005-0027786 A | 3/2005 |
| KR | 10-2006-0099441 A | 9/2006 |

OTHER PUBLICATIONS

Japanese Office Action issued Apr. 2, 2013 in counterpart Japanese Application No. 2012-500712 (3 pages, in Japanese, with partial English translation).

Chinese Office Action issued Aug. 12, 2013 in counterpart Chinese Application No. CN 201080012455.5. (22 pages, in Chinese, with English language translation).

Japanese Office Action mailed Dec. 17, 2013 in counterpart Japanese Application No. 2012-500712 (5 pages, in Japanese, with partial English translation).

Chinese Office Action mailed Jan. 20, 2014 in counterpart Chinese Application No. 201080012455.5 (19 pages in Chinese, with complete English translation).

* cited by examiner

SIGNAL QUALITY MEASURING APPARATUS AND METHOD THEREOF

CROSS-REFERENCE TO RELATED APPLICATIONS

This application claims the benefit of U.S. Provisional Application Nos. 61/161,457 filed on Mar. 19, 2009, 61/165,578 filed on Apr. 1, 2009, and 61/169,417 filed on Apr. 15, 2009, and Korean Patent Application No. 10-2009-0106666 filed on Nov. 5, 2009, in the Korean Intellectual Property Office, the disclosures of which are incorporated herein by reference in their entirety.

BACKGROUND OF THE INVENTION

1. Field of the Invention

Aspect of the invention relate to quality measurement of an input signal, and more particularly, to a signal quality measuring apparatus and method thereof, whereby a quality of an input signal is measured based on level information of the input signal, wherein the level information is extracted according to a relationship between the input signal and a binary signal generated from the input signal.

2. Description of the Related Art

A binary signal is recorded in a storage medium such as an optical disc. However, a radio frequency (RF) signal read from the optical disc has an analog signal characteristic due to a characteristic of the optical disc and an optical characteristic, and a magnitude of the RF signal decreases as recording density increases, such that distortion of a reproduction signal increases with the addition of only a small amount of noise.

Thus, in an optical device field using a high density optical disc, in order to improve a quality of the reproduction signal, techniques have been proposed to measure a quality of an input signal based on a relationship between the input signal (or, an RF signal) in an analog form and a binary signal of the input signal.

In particular, techniques have been proposed to extract level information of the input signal by referring to the relationship between the input signal and the binary signal of the input signal, and to measure the quality of the input signal based on the extracted level information of the input signal. However, an amplitude of a short periodic signal is different from an amplitude of a long periodic signal according to a channel characteristic, and a technique capable of measuring the quality of the input signal according to the channel characteristic is not found in the related art.

SUMMARY OF THE INVENTION

Aspects of the invention relate to a signal quality measuring apparatus and a method thereof, whereby the quality of an input signal is measured based on level information of the input signal, which is extracted according to a channel characteristic.

According to an aspect of the invention, a signal quality measuring apparatus includes a binary signal generating unit to generate a binary signal from an input signal; a level information extracting unit to extract level information from a relationship between the input signal and the binary signal using at least two window lengths; and a quality calculating unit to calculate a quality of the input signal based on the level information.

According to an aspect of the invention, the at least two window lengths are set according to a channel characteristic of the input signal.

According to an aspect of the invention, the at least two window lengths are determined according to a maximum run-length and a minimum run-length of the input signal.

According to an aspect of the invention, the binary signal generating unit includes an adaptive equalizer to equalize the input signal according to an adaptive reference level; a Viterbi decoder to generate the binary signal from a signal output from the adaptive equalizer according to the adaptive reference level; and an adaptive reference level generator to generate the adaptive reference level using the input signal and the binary signal generated by the Viterbi decoder.

According to an aspect of the invention, the level information extracting unit extracts level information of a run-length pattern of the binary signal in which a beginning and an ending are filled with 1s and a middle portion is filled with 0s, and level information of a run-length pattern of the binary signal in which a beginning and an ending are filled with 0s and a middle portion is filled with 1s, for each of the at least two window lengths.

According to an aspect of the invention, the level information extracting unit selects, from the input signal, signals having run-lengths 2 less than each of the at least two window lengths, and obtains average values of the selected signals to extract the level information.

According to an aspect of the invention, the at least two window lengths are 4 and 10.

According to an aspect of the invention, the window lengths are 5 and 11.

According to an aspect of the invention, the level information extracting unit extracts the level information by selectively using window lengths of 4 and 10, or window lengths of 5 and 11, according to a sampling method used in generating the binary signal from the input signal.

According to an aspect of the invention, when the sampling method includes a 0 point, the level information is extracted using the window lengths of 4 and 10, and when the sampling method does not include a 0 point, the level information is extracted using the window lengths of 5 and 11.

According to an aspect of the invention, a signal quality measuring method includes generating a binary signal from an input signal; extracting level information from a relationship between the input signal and the binary signal using at least two window lengths; and calculating a quality of the input signal based on the level information.

According to an aspect of the invention, the generating of the binary signal adaptively equalizing the input signal according to an adaptive reference level; performing a Viterbi decoding operation to generate the binary signal from the adaptively equalized input signal according to the adaptive reference level; and generating the adaptive reference level using the input signal and the binary signal generated by performing the Viterbi decoding.

According to an aspect of the invention, a computer-readable recording medium has recorded thereon a program for controlling a computer to perform a signal quality measuring method according to aspects of the invention.

Additional aspects of the invention will be set forth in part in the description that follows, and in part, will be obvious from the description, or may be learned by practice of aspects of the invention.

BRIEF DESCRIPTION OF THE DRAWINGS

The above and other aspects of the invention will become apparent and more readily appreciated from the following description of embodiments of aspects of the invention, taken in conjunction with the accompanying drawings, in which.

DETAILED DESCRIPTION OF THE INVENTION

Figure 1:
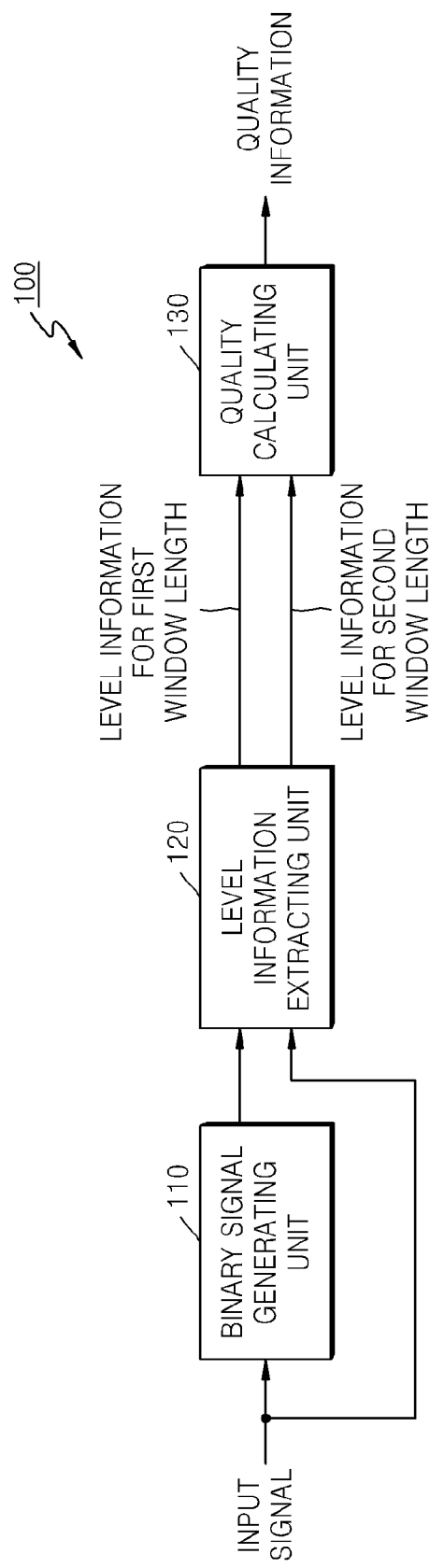
FIG. 1 is a block diagram of a signal quality measuring apparatus according to an aspect of the invention.

Reference will now be made in detail to embodiments of aspects of the invention, examples of which are shown in the accompanying drawings, wherein like reference numerals refer to like elements throughout. The embodiments are described below in order to explain aspects of the invention by referring to the figures.

FIG. 1 is a block diagram of a signal quality measuring apparatus 100 according to an aspect of the invention. The signal quality measuring apparatus 100 may be included in a device for converting an analog signal (a radio frequency (RF) signal) read from an optical disc into a digital signal and thus processing the digital signal. The signal quality measuring apparatus 100 of FIG. 1 includes a binary signal generating unit 110, a level information extracting unit 120, and a quality calculating unit 130.

The binary signal generating unit 110 generates a binary signal from the input signal. To generate the binary signal, the binary signal generating unit 110 may include a comparator. Also, the binary signal generating unit 110 may include an equalizer for improving the input signal before the comparator to improve a performance of the comparator. In addition, in order to reduce an error rate of the binary signal, the binary signal generating unit 110 may include a Viterbi decoder for discriminating a binary signal based on a form of an input signal.

In general, the Viterbi decoder generates the binary signal, assuming that the input signal is in a specific form, and thus, an equalizer or an adaptive equalizer of which coefficients vary may be used to create the specific form. In general, the equalizer is formed of a finite impulse response (FIR) filter, and two or more various types of equalizers for signal improvement may be used to improve a signal in a specific frequency band, or to reduce noise. In this manner, the binary signal generating unit 110 may vary, and is not limited to the aforementioned types.

Figure 2:
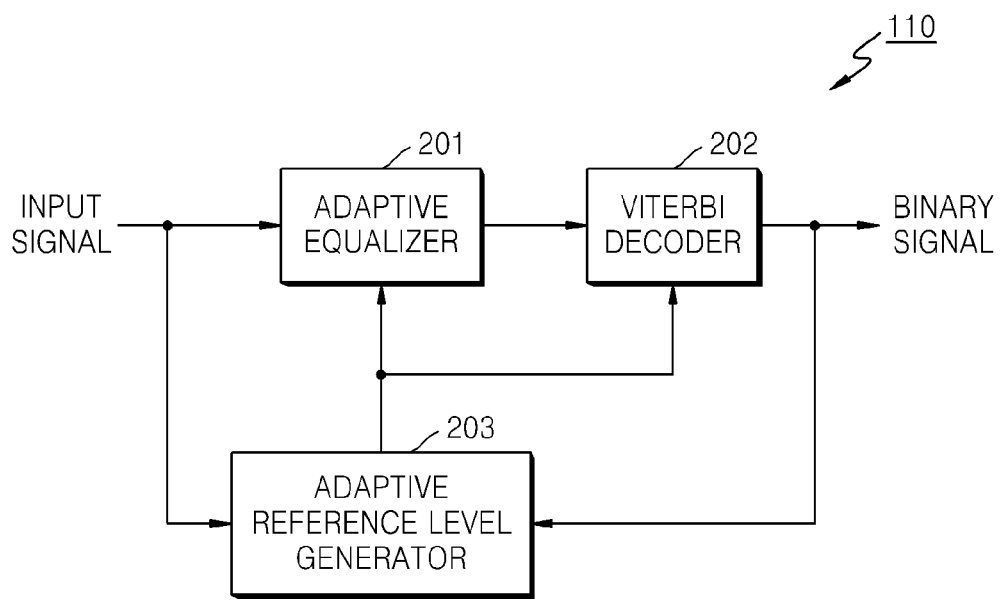
FIG. 2 is a block diagram of an example of a binary signal generating unit in FIG. 1.

FIG. 2 is a block diagram of an example of the binary signal generating unit 110 in FIG. 1. Referring to FIG. 2, the binary signal generating unit 110 includes an adaptive equalizer 201, a Viterbi decoder 202, and an adaptive reference level generator 203.

The adaptive equalizer 201 is the same as the adaptive equalizer described with reference to FIG. 1, and equalizes an input signal as an equalizer coefficient is adaptively varied.

Many errors occur when generating a binary signal as a recording density of the optical disc increases. In order to overcome these errors, the Viterbi decoder 202 checks a form of the input signal according to a partial response maximum likelihood (PRML) method, determines which ideal signal generated from one of binary signals is most similar to the form of the input signal, and then generates a binary signal. Since the PRML method is used, it is necessary to improve a characteristic of the input signal to allow the characteristic of the input signal to match the ideal signal generated from one of the binary signals, so a general equalizer may be used, or the adaptive equalizer 201 may be used to obtain a higher performance.

Figure 3:
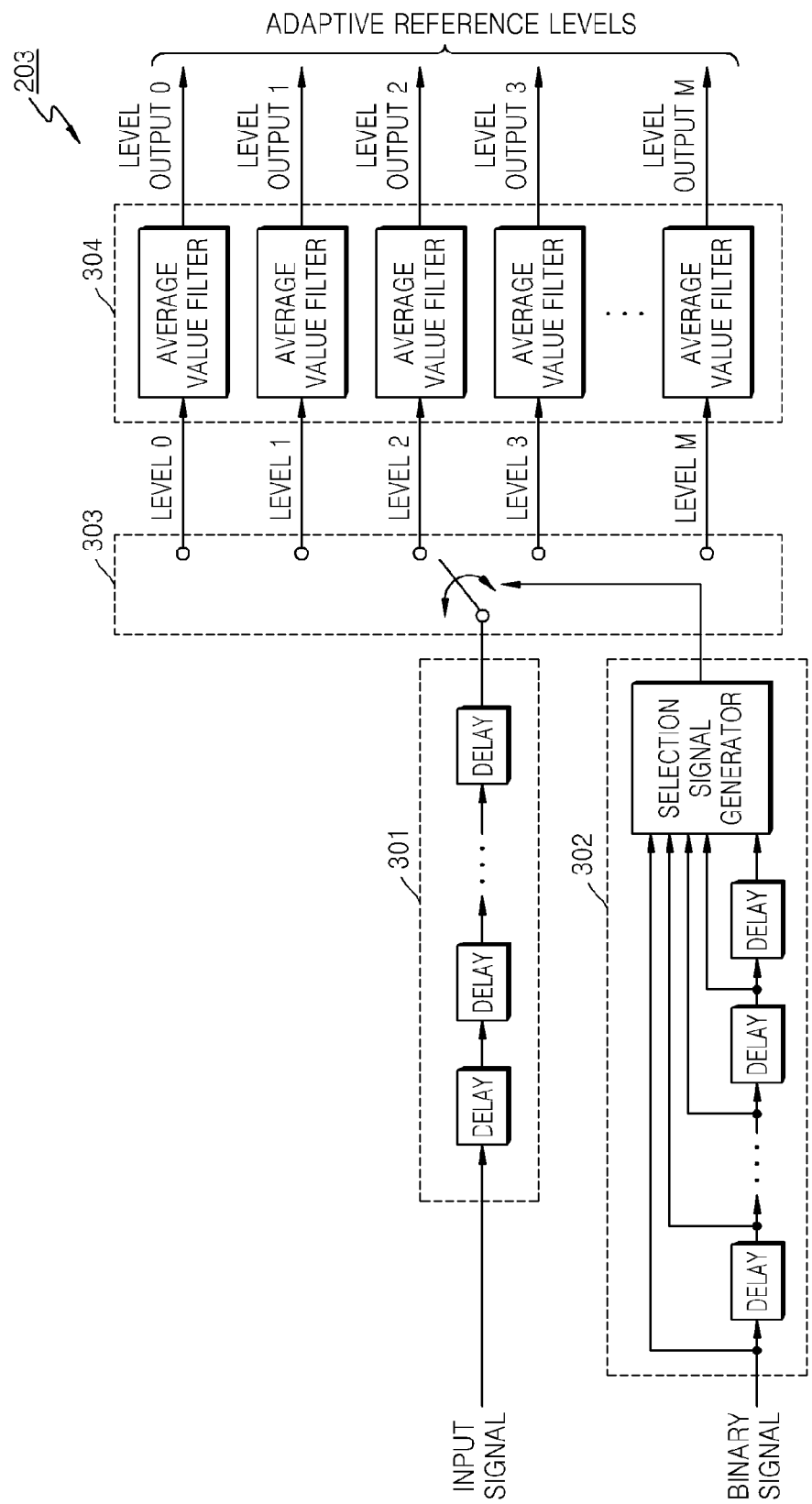
FIG. 3 is a schematic block diagram of an example of an adaptive reference level generator in FIG. 1.

The adaptive reference level generator 203 generates an adaptive reference level using the input signal and the binary signal generated by the Viterbi decoder 202. To generate the adaptive reference level, the adaptive reference level generator 203 may have a structure as shown in FIG. 3. FIG. 3 is a schematic block diagram of an example of the adaptive reference level generator 203 in FIG. 2.

Referring to FIG. 3, the adaptive reference level generator 203 includes a delaying unit 301 for delaying the input signal using a plurality of delay elements, a selection signal generating unit 302 including a plurality of delay elements for delaying the binary signal and a selection signal generator for generating a selection signal based on signals output from the plurality of delay elements for delaying the binary signal, a selection unit 303 for selecting a level of the input signal according to the selection signal generated by the selection signal generating unit 302, and an adaptive reference level output unit 304 for outputting a result of obtaining an average value of a signal input via the selection unit 303 as an adaptive reference level.

The level information extracting unit 120 of FIG. 1 may be defined as a channel identifier for extracting level information from a relationship between the binary signal and the input signal. The level information extracting unit 120 extracts the level information using at least two window lengths corresponding to various channel characteristics. The window length may be defined as a window size. The at least two window lengths may be set according to a channel characteristic. For example, the at least two window lengths may be set according to a maximum run-length and a minimum run-length of the input signal, respectively.

The level information extracting unit 120 may be divided and configured according to the window lengths. That is, when the level information is extracted using the two window lengths, the level information extracting unit 120 may be configured to be allocated to each of the two window lengths. The level information extracting unit 120 extracts the level information corresponding to each of the two window lengths.

Figure 4:
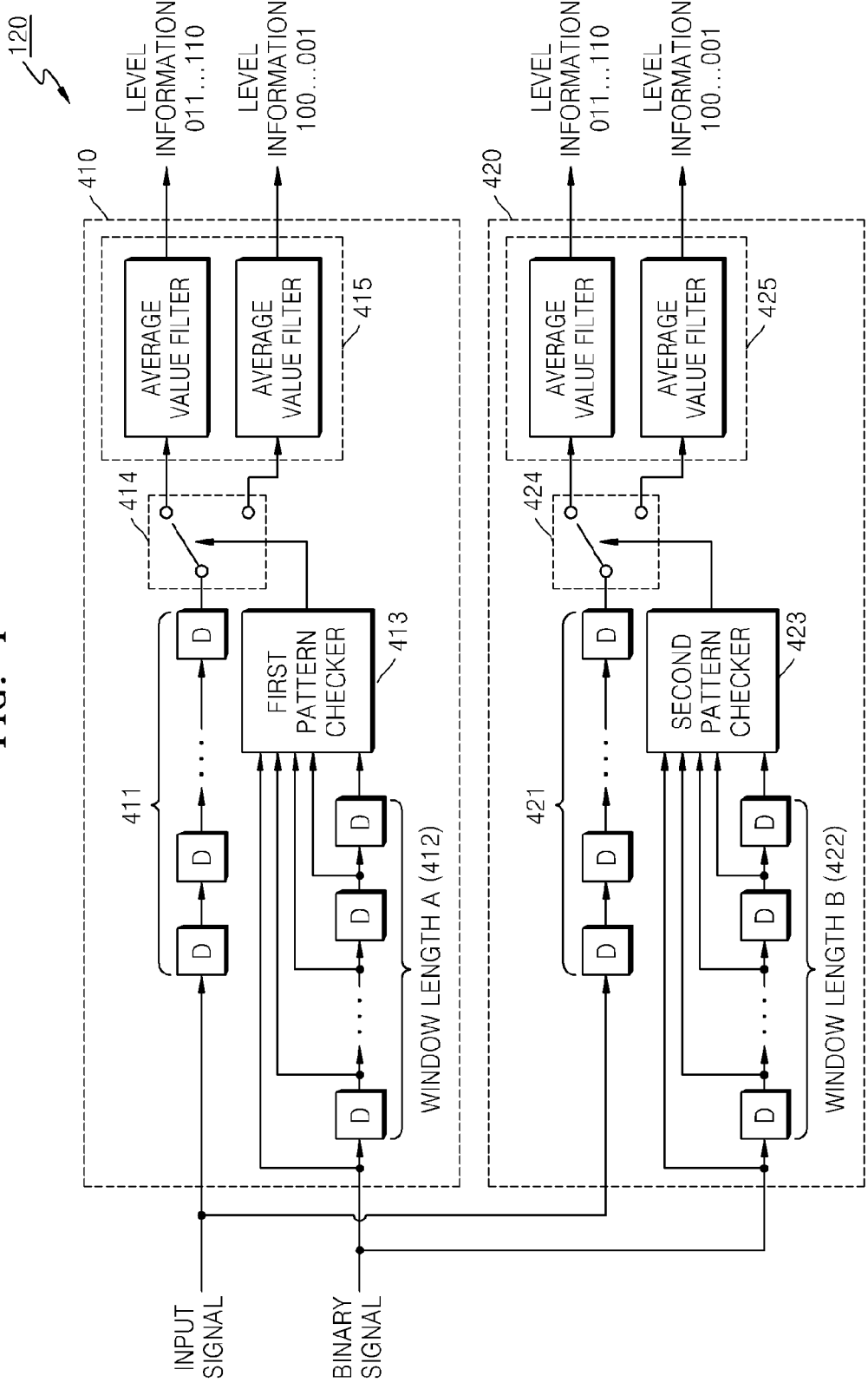
FIG. 4 is a schematic block diagram of an example of a level information extracting unit in FIG. 1.

FIG. 4 is a schematic block diagram of an example of the level information extracting unit 120 in FIG. 1. The example of the level information extracting unit 120 in FIG. 4 corresponds to a case in which two pieces of level information are extracted for each of two window. The level information extracting unit 120 of FIG. 4 extracts only necessary level information for calculating a signal quality using the two window lengths so that it is possible to obtain desired information while decreasing complexity of a whole algorithm.

FIG. 4 corresponds to a case in which a binary signal is checked for a run-length pattern whose middle portion is filled with 0s and whose beginning and ending are filled with 1s, and a run-length pattern whose middle portion is filled with 1s and whose beginning and ending are filled with 0s. to extract information corresponding to each run-length, whereby level information of an input signal corresponding to the binary signal is extracted. Since the level information is extracted using at least two window lengths, it is possible to solve a problem that occurs when extracted level information is incorrect due to use of a single window that results in a whole channel characteristic not being reflected.

The level information extracting unit 120 may use a window length corresponding to each period to measure a characteristic of each periodic signal, and may use one window length to extract a characteristic of a specific periodic signal. In the case where one window length is used, the level information extracting unit 120 may check for a pattern whose middle portion is filled with 0s and whose beginning and ending are filled with 1s, thereby extracting level information of an input signal corresponding to a binary signal. Thus, the number of pieces of extracted level information may be reduced.

The level information extracting unit 120 of FIG. 4 includes a first level information extractor 410 based on a window length A, and a second level information extractor 420 based on a window length B. The first level information extractor 410 includes a plurality of delay elements 411 for delaying an input signal, a plurality of delay elements 412 corresponding to the window length A for delaying the binary signal, a first pattern checker 413 for checking the binary signal for a first pattern based on signals output from the plurality of delay elements 412, a selector 414 for selecting and transmitting a signal output from the plurality of delay elements 411 according to the checking result output from the first pattern checker 413, and an average value filter group 415 for obtaining an average value of the input signal transmitted via the selector 414 and thus outputting level information. The level information output from the average value filter group 415 corresponds to level information of a periodic signal having a run-length of window length A-2.

The second level information extractor 420 is configured in a similar manner as the first level information extractor 410, except that it includes a plurality of delay elements 422 corresponding to the window length B for delaying the binary signal. Level information extracted from the second level information extractor 420 corresponds to level information of a periodic signal having a run-length of window length B-2. The level information may be defined as a level value.

Figure 5:
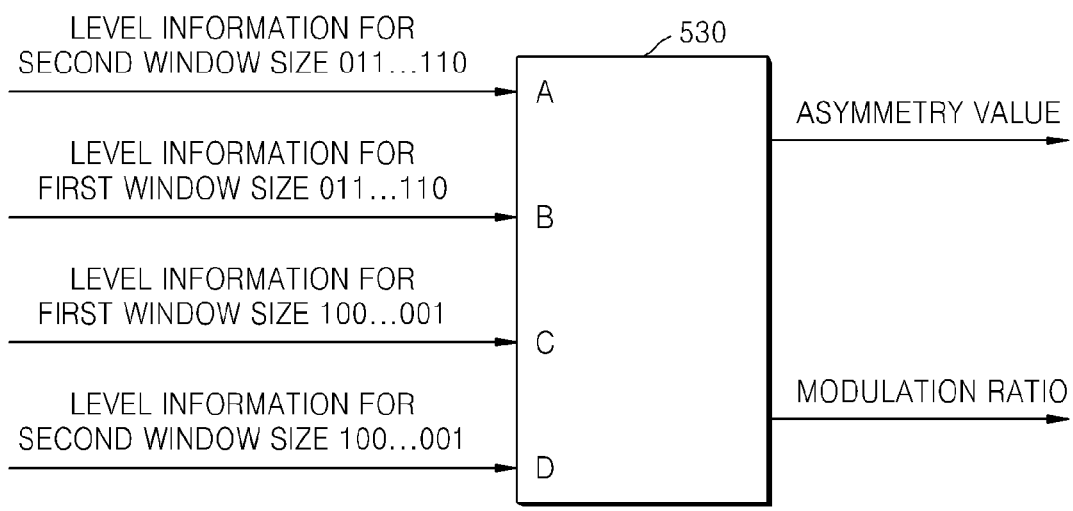
FIG. 5 is a diagram of an example of a quality calculating unit corresponding to the level information extracting unit of FIG. 4.

When the level information extracting unit 120 is configured as shown in FIG. 4, the quality calculating unit 130 of FIG. 1 calculates necessary information based on the extracted level information. Thus, the quality calculating unit 130 may be defined as an information calculation unit. FIG. 5 is a diagram of an example of a quality calculating unit 530 corresponding to the level information extracting unit 120 of FIG. 4.

The quality calculating unit 530 of FIG. 5 may calculate various types of information based on the level information, and FIG. 5 corresponds to a case in which an asymmetry value of the input signal, and a modulation ratio of an amplitude of a lowest frequency signal and an amplitude of a highest frequency signal of the input signal, are calculated. Since the asymmetry value corresponds to an average value of a highest frequency component signal with respect to an amplitude of the input signal, in order to obtain the asymmetry value, it is necessary to obtain maximum and minimum values of a specific run-length signal, and an average value of another run-length signal.

That is, in the case of FIG. 5, the asymmetry value is obtained using the following Equation:

$$\text{asymmetry value} = \frac{\frac{A+D}{2} - \frac{B-C}{2}}{A-D} \quad (1)$$

Also, in the case of FIG. 5, the modulation ratio is obtained using the following Equation:

$$\text{modulation ratio} = \frac{B-C}{A-D} \quad (2)$$

In this manner, when the level information extracted using the at least two window lengths is used, only necessary level information is used so that an algorithm need not be complicated, and the signal quality may be correctly measured according to the correct level information.

Quality information to be output from the quality calculating unit 530 may be various types of information, other than the asymmetry value and the modulation ratio. For example, non-linearity information of levels, which are bases of the amplitude of the input signal or a branch metric necessary for the Viterbi decoder 202, may be calculated, or signal distortion or a signal error may be detected based on a change in the levels. In other words, every method of measuring a quality (or a characteristic) of the input signal based on various types of level information corresponding to at least two window lengths may be performed by the quality calculating unit 530.

Figure 6:
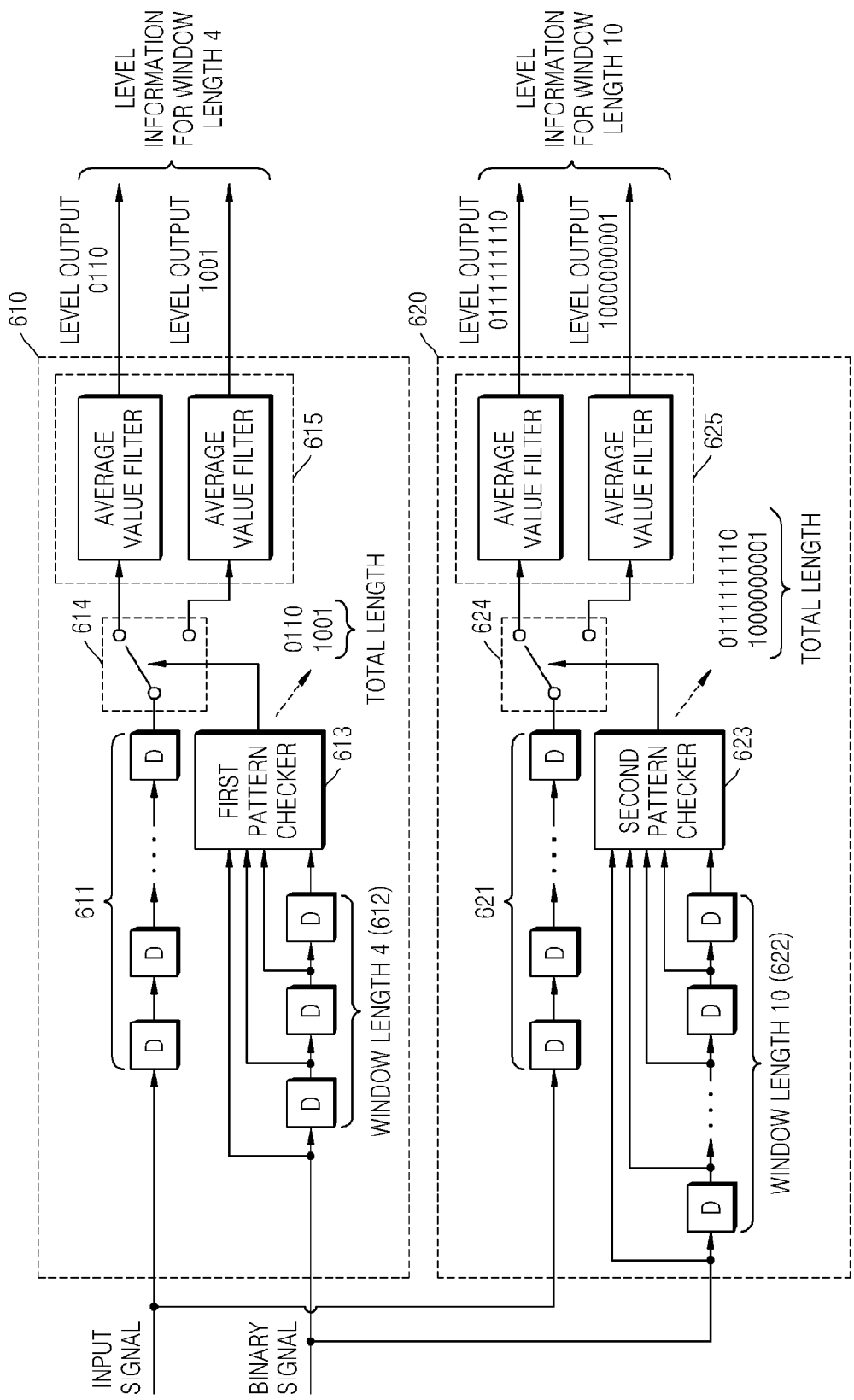
FIG. 6 is a schematic block diagram of an example of a level information extracting unit in FIG. 4.
Figure 7:
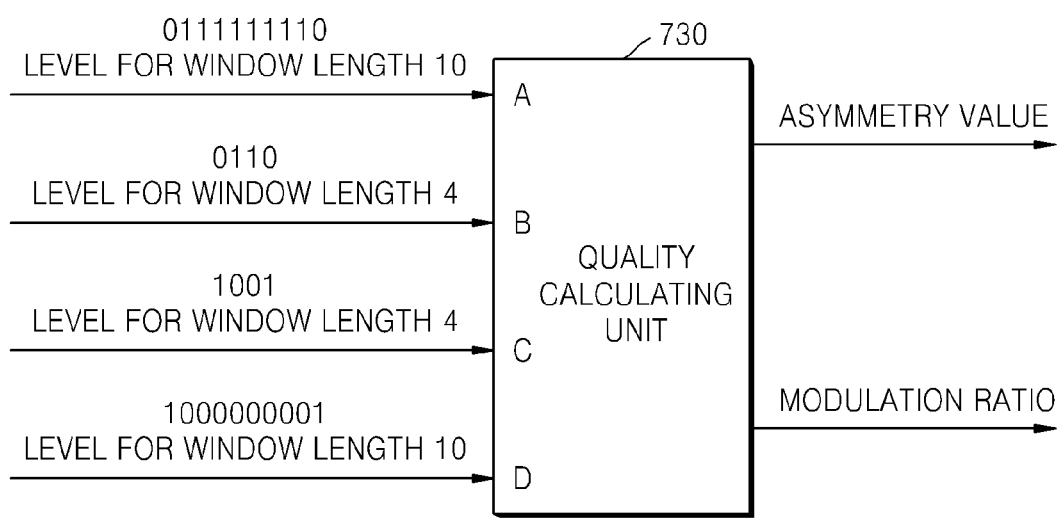
FIG. 7 is a diagram of an example of a quality calculating unit corresponding to the level information extracting unit of FIG. 6.

FIGS. 6 and 7 are schematic block diagrams of examples of the level information extracting unit 120 of FIG. 4 and the quality calculating unit 530 of FIG. 5, respectively, and correspond to a case in which a channel characteristic with respect to window lengths 4 and 10 is extracted. In the case of a Blu-ray Disc (BD), a minimum run-length is 2 and a maximum run-length is 8. However, a maximum run-length 9 also exists in the case of a sync pattern for matching synchronization patterns. As shown in FIG. 6, when level information corresponding to a run-length 8 (window length 10–2) and level information corresponding to a run-length 2 (window length 4–2) are only extracted and used to extract only 8T information and 2T information, a signal characteristic of only a 8T portion and not a 9T portion may be correctly reflected.

FIG. 7 is a diagram of a calculation example of the asymmetry value and the modulation ratio, and corresponds to a case involving obtaining an average value from maximum/minimum values of an input signal, obtaining an average value of a signal corresponding to a highest frequency component, dividing the average value of the signal by the maximum/minimum values of the input signal, and thus calculating the asymmetry value using Equation 1. The maximum/minimum values of the input signal are extracted from level information having a long window length, and level information of the highest frequency component is extracted from level information having a short window length, so that a correct characteristic of the input signal may be extracted. Also, the modulation ratio is calculated using Equation 2.

Figure 8:
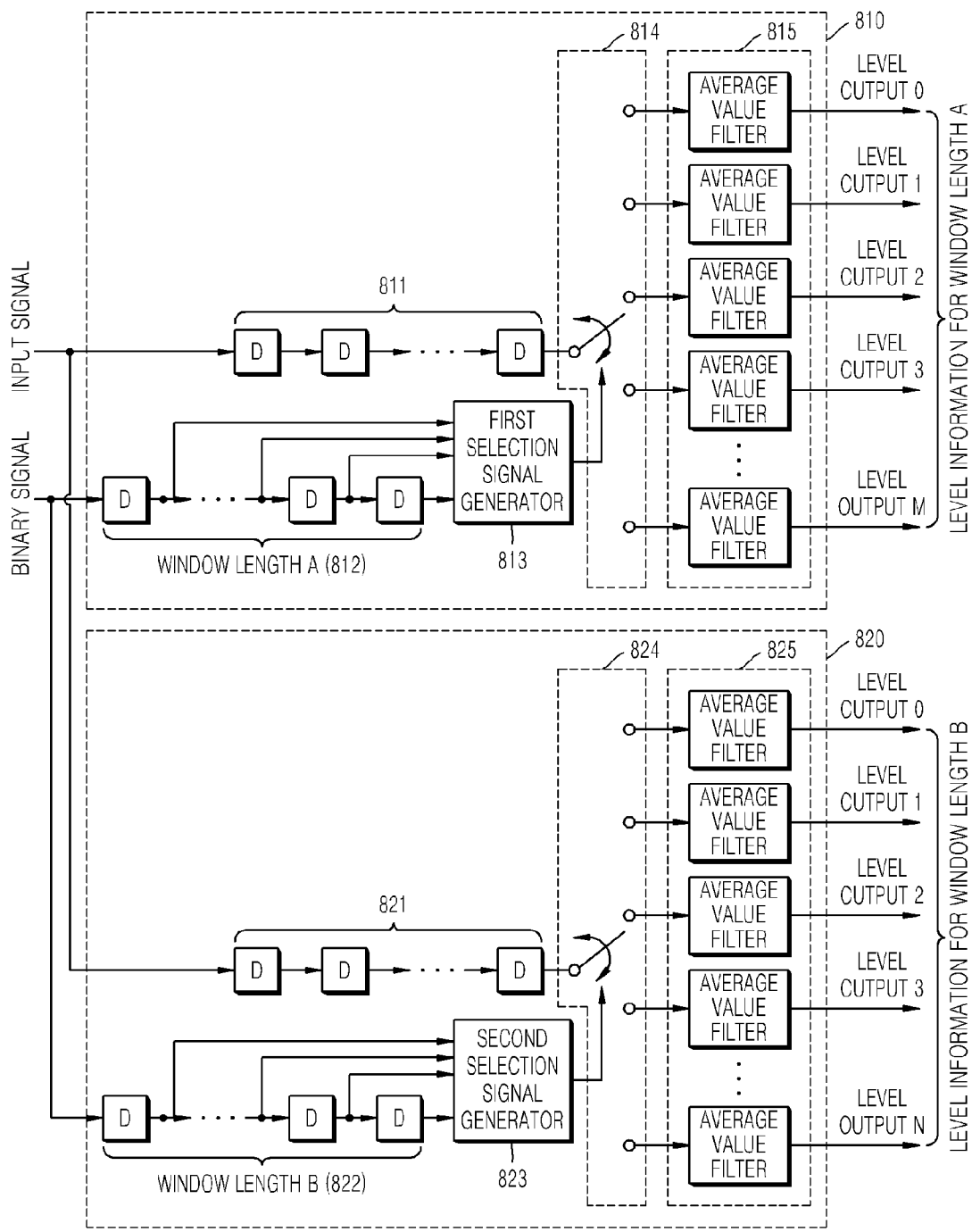
FIG. 8 is a schematic block diagram of another example of the level information extracting unit of FIG. 1.

FIG. 8 is a schematic block diagram of another example of the level information extracting unit 120 of FIG. 1, and corresponds to a case in which level information is extracted using two window lengths in the same manner as shown in FIG. 4. However, multilevel information is extracted, instead of using the set run-length patterns of FIG. 4. In the case of FIG. 8, the level information is extracted using two window lengths, but according to a characteristic of an input signal, a level information extracting unit using three or more window lengths may be configured.

Figure 9:
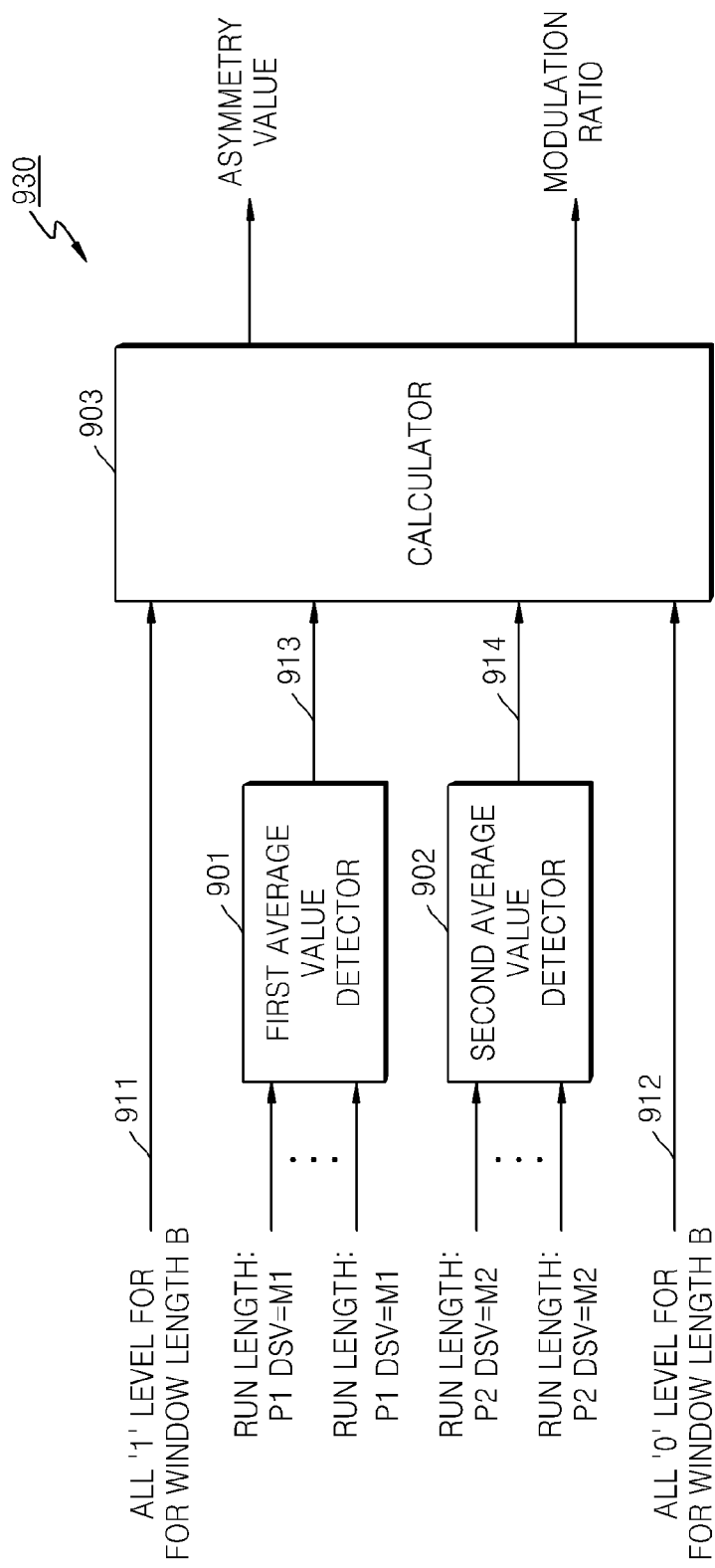
FIG. 9 is a schematic block diagram of another example of a quality calculating unit corresponding to the level information extracting unit of FIG. 8.

FIG. 9 is a schematic block diagram of another example of a quality calculating unit 930 corresponding to the level information extracting unit of FIG. 8. Thus, the quality calculating unit 930 of FIG. 9 may calculate various types of information based on the level information extracted from the level information extracting unit of FIG. 8, and calculates the asymmetry value and the modulation ratio of the input signal. A calculator 903 calculates the asymmetry value and the modulation ratio using the following Equations 3 and 4 based on level information 911 detected when an input signal having a window length B is all 1s, level information 912 detected when the input signal having a window length B is all 0s, and level information 913 and 914 respectively detected by a first average value detector 901 and a second average value detector 902:

$$\text{asymmetry value} = \frac{\frac{UL + LL}{2} - \frac{UML - LML}{2}}{UL - LL} \quad (3)$$

$$\text{modulation ratio} = \frac{UML - LML}{UL - LL} \quad (4)$$

In Equations 3 and 4, UL indicates uppermost level information and may correspond to the level information 911, LL indicates lowermost level information and may correspond to the level information 912, UML indicates upper mid-level information and may correspond to the level information 913, and LML indicates lower mid-level information and may correspond to the level information 914. The upper and lower mid-level information 913 and 914 may have different digital sum values. A digital sum value is a sum value obtained by matching +1 with a case in which an input signal is 1, and matching −1 with a case in which an input signal is 0. For example, when a value of 11001 is input, the digital sum value is +1+1−1−1+1=+1. The upper and lower mid-level information 913 and 914 are obtained by detecting average values of input signals with the first average value detector 901 and the second average value detector 902, respectively. The input signals input to the first average value detector 901 are level information of each of signals having a run-length=P1 and a DSV=M1, and the input signals input to the second average value detector 902 are level information of each of signals having a run-length=P2 and a DSV=M2. P1 and P2 may be the same.

Figure 10:
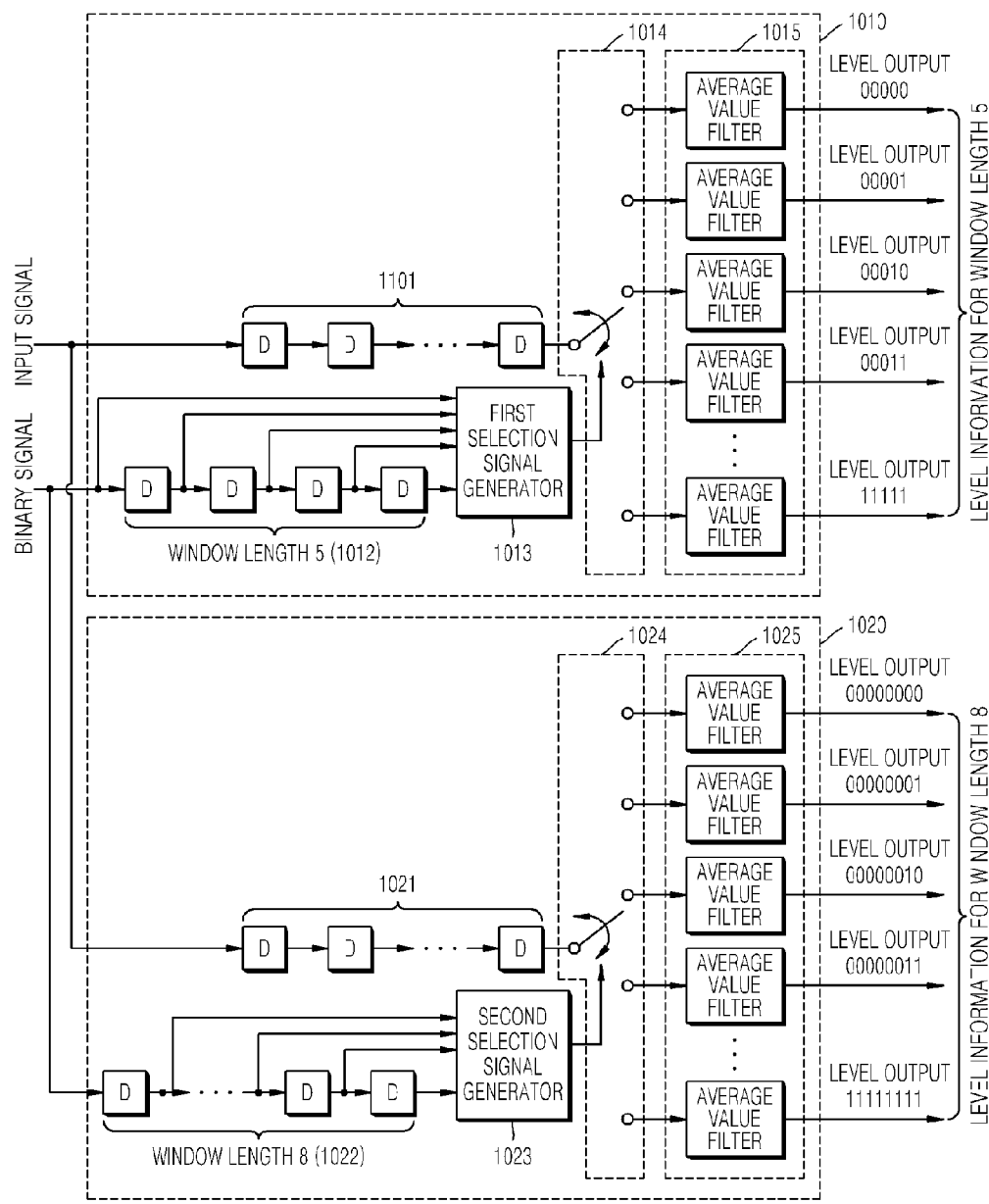
FIG. 10 is a schematic block diagram of an example of the level information extracting unit in FIG. 8.
Figure 11:
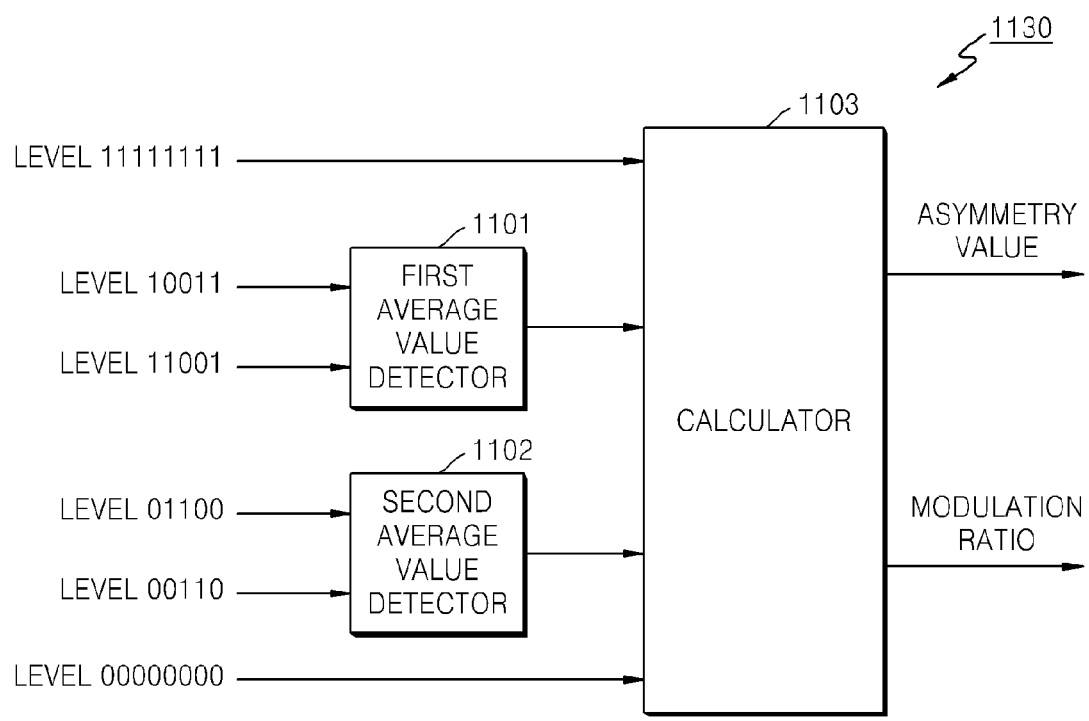
FIG. 11 is a schematic block diagram of an example of a quality calculating unit corresponding to the level information extracting unit of FIG. 10.

FIGS. 10 and 11 are schematic block diagrams of examples corresponding to the cases of FIGS. 8 and 9, where the window lengths are set to 5 and 8, respectively. Referring to FIG. 10, when the window length is 5, a maximum of 32 pieces of level information may be obtained, and when the window length is 8, a maximum of 256 pieces of level information may be obtained. Obviously, not all of such level information is used, but only necessary level information is extracted and used by a quality calculating unit.

For example, in order to obtain the asymmetry value, levels corresponding to a maximum value and a minimum value of an input signal are required, so that, when the window length is 8, only a level corresponding to level 11111111 and a level corresponding to level 00000000 are calculated. The level 00000000 means the amplitude of an input signal corresponding to a binary signal of 00000000 when the binary signal of 00000000 is obtained, and in general, when the binary signal is all 0s, the input signal has the minimum value. On the contrary, the level 11111111 means the amplitude of an input signal corresponding to a binary signal of 11111111 when the binary signal of 11111111 is obtained, and in general, when the binary signal is all 1s, the input signal has the maximum value. In other words, when the window length is 8, the maximum 256 pieces of level information may be obtained, but only two pieces of level information from among them need be used.

When the level information obtained when the window length is 5 is used, levels of a highest frequency component signal may be extracted. If a minimum run-length is 2, i.e., considering a case in which 0s or 1s are repeated at least twice in a binary signal, levels corresponding to the case may be level 10011, level 11001, level 01100, or level 00110, which are included in a type of level information including the minimum run-length of 2. Thus, level information corresponding to a highest frequency may be used with such a type of level information, and in this case, too many numerical combinations are generated, and in a specific system, a minimum run-length is even prohibited from being frequently repeated, such that a specific level may not exist. However, since the level information is extracted using the at least two window lengths, it is possible to resolve the aforementioned problems.

FIG. 11 is a schematic block diagram of another example of a quality calculating unit 1130 for obtaining the asymmetry value and the modulation ratio based on the level information extracted in the example of FIG. 10. The quality calculating unit 1130 of FIG. 11 may calculate an average value obtained from maximum/minimum values of an input signal, an average value of a signal corresponding to a highest frequency component, the asymmetry value by dividing the average value of the signal by the maximum/minimum values of the input signal using Equation 3, and the modulation ratio using Equation 4. Since the maximum/minimum values of the input signal are extracted (level 11111111, level 00000000) from level information having a long window length, and level information of a highest frequency component is extracted (level 10011, level 11001, level 01100, and level 00110) from level information having a short window length, the quality calculating unit 1130 of FIG. 11 is configured to extract a correct characteristic of the input signal. The asymmetry value may be obtained by calculating an asymmetry value of signal levels having a minimum run-length and signal levels having a maximum run-length. The quality calculating unit 1130 in FIG. 11 includes a first average value detector 1101 that corresponds to the first average value detector 901 in FIG. 9 and calculates an average value of the level 10011 and the level 11001 having a run-length=2 and a DSV=+1, a second average value detector 1102 that corresponds to the second average value detector 902 in FIG. 9 and calculates an average value of the level 01100 and the level 00110 that have a run-length=2 and a DSV=−1, and a calculator 1103 that corresponds to the calculator 903 in FIG. 9 and calculates the asymmetry value and the modulation ratio using Equations 3 and 4.

Figure 12:
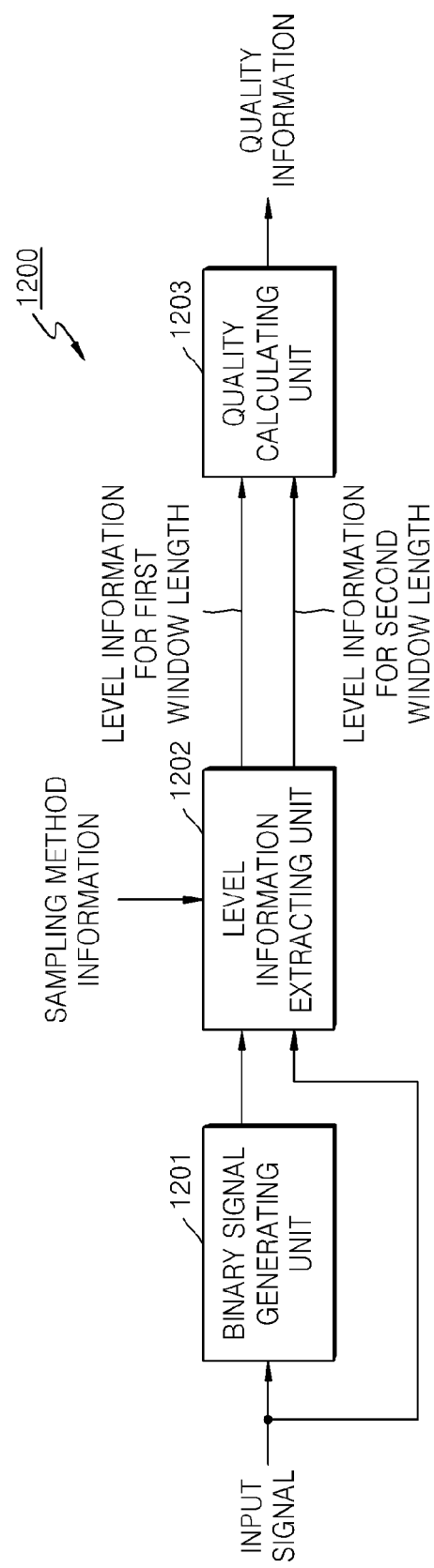
FIG. 12 is a block diagram of a signal quality measuring apparatus according to an aspect of the invention.

FIG. 12 is a block diagram of a signal quality measuring apparatus 1200 according to an aspect of the invention, which performs a level information extracting method according to a sampling method. A binary signal generating unit 1201 and a quality calculating unit 1203 included in the signal quality measuring apparatus 1200 are configured and operated in the same manner as the binary signal generating unit 110 and the quality calculating unit 130 of FIG. 1, and thus, descriptions thereof will be omitted here.

Figure 13A:
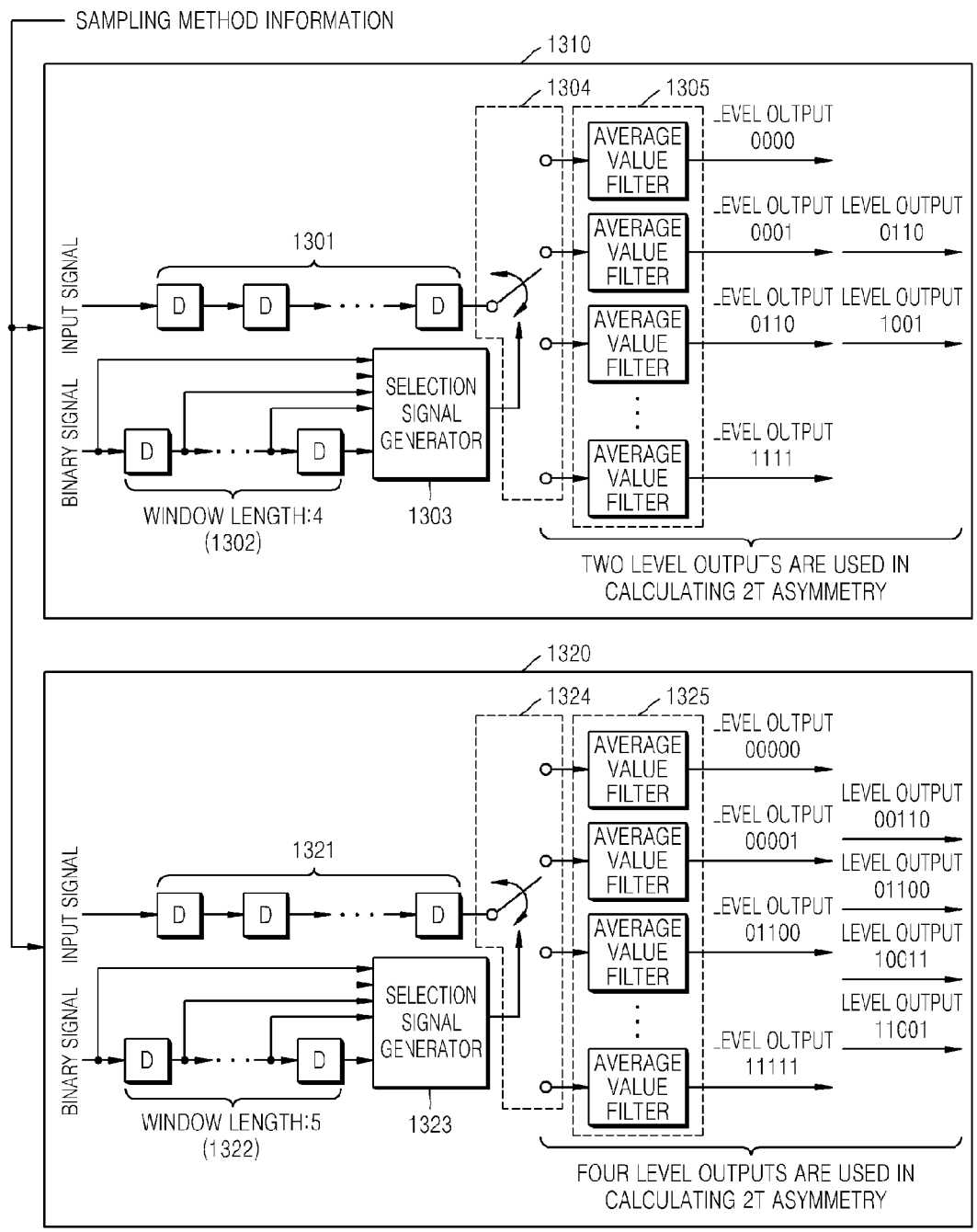
FIGS. 13A and 13B are schematic block diagrams of an example of a level information extracting unit in FIG. 12.
Figure 13B:
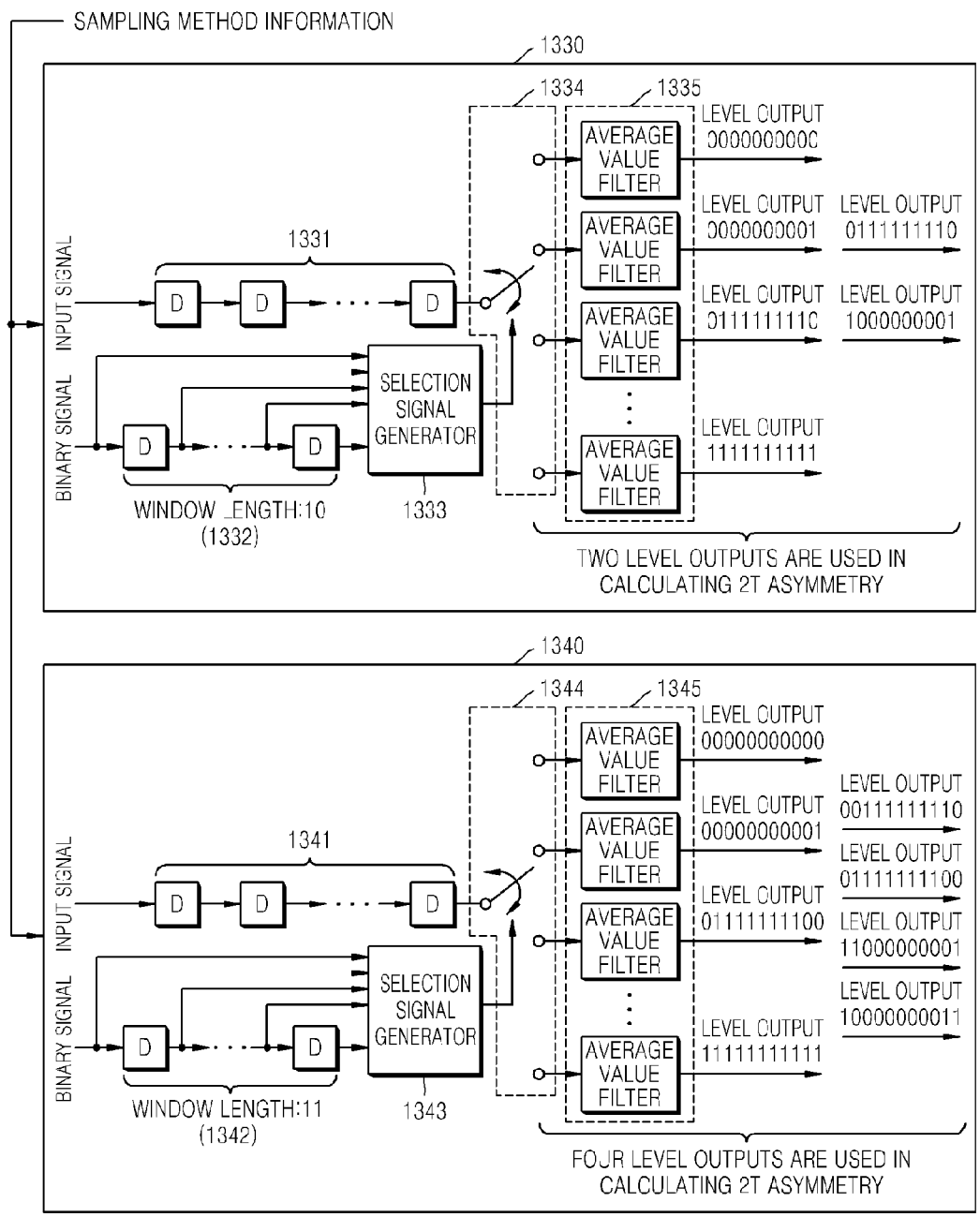
Figure 14A:
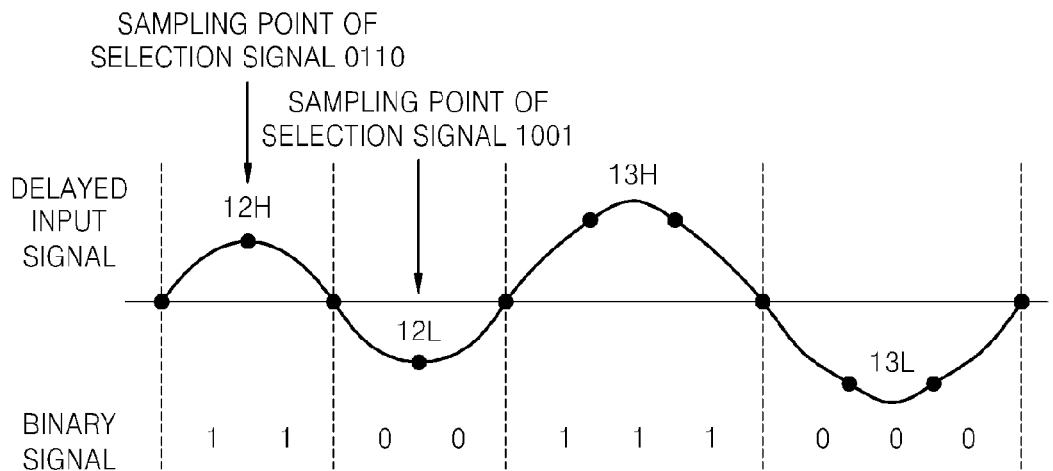
FIGS. 14A and 14B are timing diagrams for describing sampling methods.
Figure 14B:
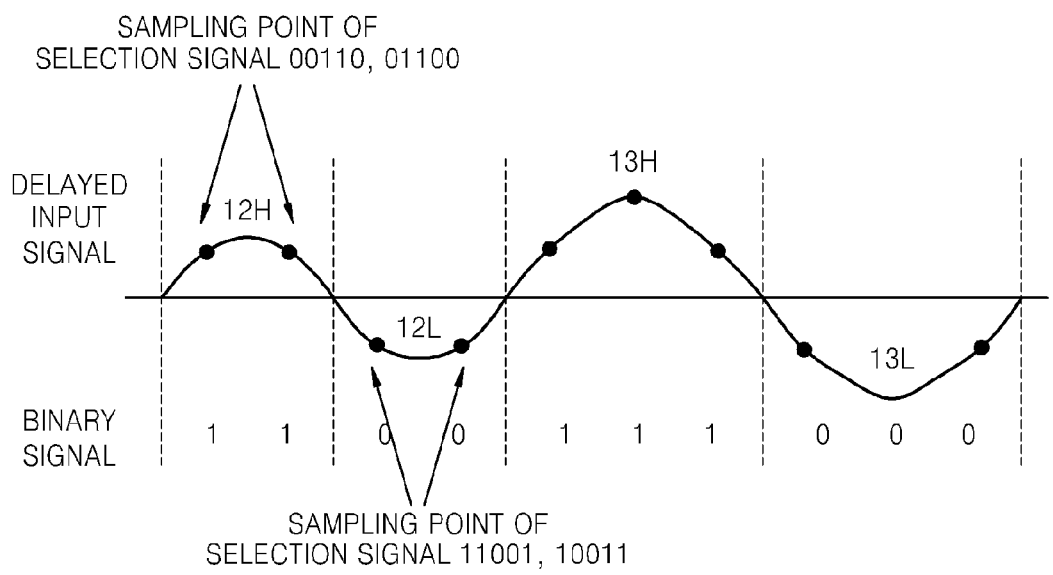

A configuration of a level information extracting unit 1202 is shown in FIGS. 13A and 13B. The level information extracting unit 1202 is operated to drive level information extracting units 1310 and 1330 based on a window length 4 1302 and a window length 10 1332 when a sampling method includes a 0 point as shown in FIG. 14A, and to drive level information extracting units 1320 and 1340 based on a window length 5 1322 and a window length 11 1342 when the sampling method does not include a 0 point as shown in FIG. 14B.

The level information extracting unit 1202 may be configured to enable operation of each of the level information extracting units 1310, 1320, 1330, and 1340 according to the sampling method, or to selectively transmit an input of an input signal and a binary signal. FIGS. 13A and 13B correspond to a case in which the operation of each of the level information extracting units 1310, 1320, 1330, and 1340 is enabled according to the sampling method. The sampling method is performed by an analog-to-digital (A/D) converter (not shown) located before the binary signal generating unit 1201. The A/D converter (not shown) converts an input signal into a digital signal. Thus, an input signal input to the level information extracting unit 1202 may be a signal before equalizing or a signal output from the A/D converter.

Figure 15:
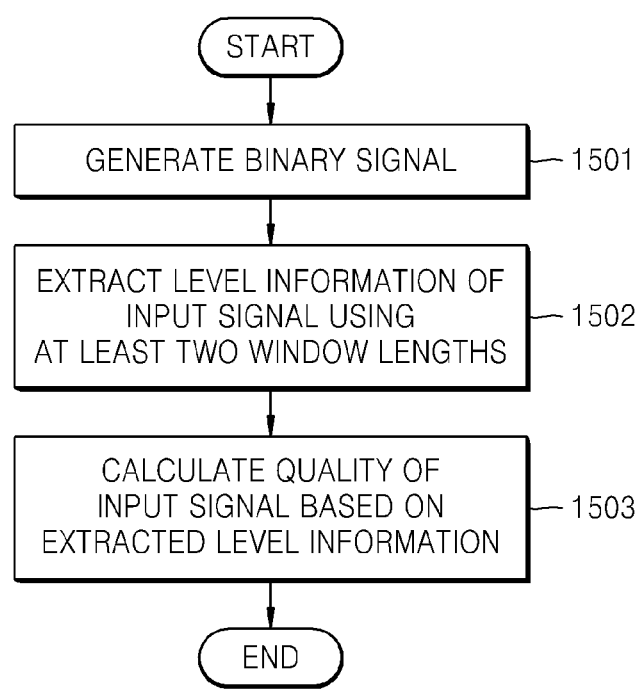
FIG. 15 is a flowchart of a signal quality measuring method according to an aspect of the invention.

FIG. 15 is a flowchart of a signal quality measuring method according to an aspect of the invention. Referring to FIG. 15, a binary signal is generated from an input signal (operation 1501). The generation of the binary signal from the input signal is the same as that described above with reference to the binary signal generating unit 110 of FIG. 1.

Next, level information of the input signal is extracted using at least two window lengths (operation 1502). The extraction of the level information using the at least two window lengths may be performed according to one of the methods corresponding to the examples of FIGS. 4, 8, and 13A and 13B. Thus, only necessary level information for performing the quality calculation is extracted.

A quality of the input signal is calculated based on the extracted level information (operation 1503). The calculation of the quality of the input signal is the same as that described above with reference to the quality calculating unit 130 of FIG. 1.

Aspects of the invention can also be embodied as computer-readable code on a computer-readable recording medium for controlling a processor, a general-purpose computer, or a special-purpose computer to perform a method of measuring a signal quality according to aspects of the invention. A computer-readable recording medium is any data storage device that can store data which can be thereafter read by a computer system. Examples of a computer-readable recording medium include read-only memory (ROM), random-access memory (RAM), CD-ROMs, DVDs, Blu-ray Discs (BDs), magnetic tapes, floppy disks, optical data storage devices, etc. The computer-readable recording medium can also be distributed over network-coupled computer systems so that the computer-readable code is stored and executed in a distributed fashion.

While aspects of the invention have been particularly shown and described with reference to embodiments thereof, it will be understood by those of ordinary skill in the art that various changes in form and details may be made in these embodiments without departing from the principles and spirit of aspects of the invention, the scope of which is defined in the claims and their equivalents.

What is claimed is:

1. A signal quality measuring apparatus comprising:
   a binary signal generating unit configured to generate a binary signal from an input signal;
   a level information extracting unit configured to extract level information from a relationship between the input signal and the binary signal using at least two window lengths; and
   a quality calculating unit configured to calculate a quality of the input signal based on the level information,
   wherein the at least two window lengths are determined according to a maximum run-length and a minimum run-length of the input signal,
   wherein the level information extracting unit comprises sub-level information extracting units corresponding to the at least two window lengths.

2. The signal quality measuring apparatus of claim 1, wherein the at least two window lengths are set according to a channel characteristic.

3. The signal quality measuring apparatus of claim 1, wherein the binary signal generating unit comprises:
   an adaptive equalizer configured to equalize the input signal according to an adaptive reference level;
   a Viterbi decoder configured to generate the binary signal from a signal output from the adaptive equalizer according to the adaptive reference level; and
   an adaptive reference level generator configured to generate the adaptive reference level using the input signal and the binary signal generated by the Viterbi decoder.

4. The signal quality measuring apparatus of claim 1, wherein the level information extracting unit extracts level information of a run-length pattern of the binary signal in which a beginning and an ending are filled with 1s and a middle portion is filled with 0s, and level information of a run-length pattern of the binary signal in which a beginning and an ending are filled with 0s and a middle portion is filled with 1s, for each of the at least two window lengths.

5. The signal quality measuring apparatus of claim 1, wherein the level information extracting unit selects, from the input signal, signals having run-lengths 2 less than each of the at least two window lengths, and obtains average values of the selected signals to extract the level information.

6. The signal quality measuring apparatus of claim 1, wherein the at least two window lengths are 4 and 10, which correspond to pieces of level information.

7. The signal quality measuring apparatus of claim 1, wherein the at least two window lengths are 5 and 11, which correspond to pieces of level information.

8. The signal quality measuring apparatus of claim 1, wherein the level information extracting unit extracts the level information by selectively using window lengths of 4 and 10, or window lengths of 5 and 11, according to a sampling method used in generating the binary signal from the input signal, wherein the window lengths correspond to pieces of level information.

9. The signal quality measuring apparatus of claim 8, wherein when the sampling method comprises a 0 point, the level information is extracted using the window lengths of 4 and 10, and when the sampling method does not comprise a 0 point, the level information is extracted using the window lengths of 5 and 11, wherein the window lengths correspond to pieces of level information.

10. The signal quality measuring apparatus of claim 1, wherein the window lengths are selected based on a relationship to a sampling method used to generate the binary signal.

11. The signal quality measuring apparatus of claim 1, wherein a first sub-level information extracting unit includes delay elements configured to delay the input signal, delay elements corresponding to a first window length for delaying the binary signal, a first pattern checker configured to check a binary signal for a first pattern based on signals output from the delay elements, a selector configured to select and transmit a signal output from the delay elements according to a checking result output from the first pattern checker, and an average value filter group configured to obtain an average value of the input signal transmitted via the selector.

12. The signal quality measuring apparatus of claim 11, further comprising a second sub-level information extracting unit including delay elements corresponding to a second window length for delaying the binary signal.

13. A signal quality measuring method comprising:
generating a binary signal from an input signal;
extracting level information from a relationship between the input signal and the binary signal using at least two window lengths; and
calculating a quality of the input signal based on the level information,
wherein the at least two window lengths are determined according to a maximum run-length and a minimum run-length of the input signal,
wherein the extracting level information comprises:
selectively transmitting an input of the input signal and the binary signal by using sub-level information extracting units corresponding to the at least two window lengths.

14. The signal quality measuring method of claim 13, wherein the at least two window lengths are set according to a channel characteristic.

15. The signal quality measuring method of claim 13, wherein the generating of the binary signal comprises:
adaptively equalizing the input signal according to an adaptive reference level;
performing Viterbi decoding to generate the binary signal from the adaptively equalized input signal according to the adaptive reference level; and
generating the adaptive reference level using the input signal and the binary signal generated by performing the Viterbi decoding.

16. The signal quality measuring method of claim 13, wherein the extracting of the level information comprises extracting level information of a run-length pattern of the binary signal in which a beginning and an ending are filled with 1s and a middle portion is filled with 0s, and level information of a run-length pattern of the binary signal in which a beginning and an ending are filled with 0s and a middle portion is filled with 1s, for each of the at least two window lengths.

17. The signal quality measuring method of claim 13, wherein the extracting of the level information comprises selecting, from the input signal, signals having run-lengths 2 less than each of the at least two window lengths, and obtaining average values of the selected signals to extract the level information.

18. The signal quality measuring method of claim 13, wherein the at least two window lengths are 4 and 10, which correspond to pieces of level information.

19. The signal quality measuring method of claim 13, wherein at least two window lengths are 5 and 11, which correspond to pieces of level information.

20. The signal quality measuring method of claim 13, wherein the extracting of the level information comprises extracting the level information by selectively using window lengths of 4 and 10, or window lengths of 5 and 11, according to a sampling method used in generating the binary signal from the input signal, wherein the window lengths correspond to pieces of level information.

21. The signal quality measuring method of claim 20, wherein, when the sampling method comprises a 0 point, the level information is extracted using the window lengths of 4 and 10, and when the sampling method does not comprise a 0 point, the level information is extracted using the window lengths of 5 and 11, wherein the window lengths correspond to pieces of level information.

22. The signal quality measuring method of claim 13, wherein only necessary level information is extracted for calculating the signal quality using the two window lengths.

* * * * *